US012597247B2

(12) United States Patent
Kandukuri et al.

(10) Patent No.: US 12,597,247 B2
(45) Date of Patent: Apr. 7, 2026

(54) UNDERWATER DEVICE FOR ACQUIRING IMAGES OF A WATER BOTTOM

(71) Applicant: PLANBLUE GMBH, Bremen (DE)

(72) Inventors: Raja Kandukuri, Bremen (DE); Guy Rigot, Bremen (DE)

(73) Assignee: PLANBLUE GMBH, Bremen (DE)

( * ) Notice: Subject to any disclaimer, the term of this patent is extended or adjusted under 35 U.S.C. 154(b) by 510 days.

(21) Appl. No.: 17/614,021

(22) PCT Filed: May 12, 2020

(86) PCT No.: PCT/EP2020/063173
§ 371 (c)(1),
(2) Date: Nov. 24, 2021

(87) PCT Pub. No.: WO2020/239431
PCT Pub. Date: Dec. 3, 2020

(65) Prior Publication Data
US 2022/0222937 A1 Jul. 14, 2022

(30) Foreign Application Priority Data

May 28, 2019 (LU) ........................................ 101240

(51) Int. Cl.
*G06V 20/05* (2022.01)
*B63G 8/00* (2006.01)
*G03B 17/08* (2021.01)

(52) U.S. Cl.
CPC .............. *G06V 20/05* (2022.01); *B63G 8/001* (2013.01); *B63G 2008/004* (2013.01); *G03B 17/08* (2013.01)

(58) Field of Classification Search
CPC ..... B63B 79/15; B63B 79/40; G01C 21/3837; G01C 21/3807; B63C 11/52; B63G 8/001;
(Continued)

(56) References Cited

U.S. PATENT DOCUMENTS 4,622,633 A * 11/1986 Ceccon ................... G06F 13/26
711/E12.086
4,967,344 A * 10/1990 Scavezze ............ G06F 11/2007
714/E11.078
(Continued)

FOREIGN PATENT DOCUMENTS

CN 104200714 A * 12/2014
KR 10-2015-0144517 * 12/2015 ............... B25J 5/00

OTHER PUBLICATIONS

Arjun Chennu et al., "A diver-operated hyperspectral imaging and topographic surveying system for automated mapping of benthic habitats", Scientific Reports, vol. 7, No. 1, Aug. 2, 2017.
(Continued)

*Primary Examiner* — Justin S Lee
(74) *Attorney, Agent, or Firm* — Hodgson Russ LLP

(57) ABSTRACT
The invention relates to an underwater device for capturing images of a seabed with multiple electrical function units, a control program for controlling one electrical function unit, another control program for controlling another electrical function unit, and at least one control device. The underwater device is characterised in that the underwater device is designed such that the control program and the other control program are selectively executable on the same control device or the control program is executable on one control device and the other control program is executable on another control device.

20 Claims, 6 Drawing Sheets

Figure 1:
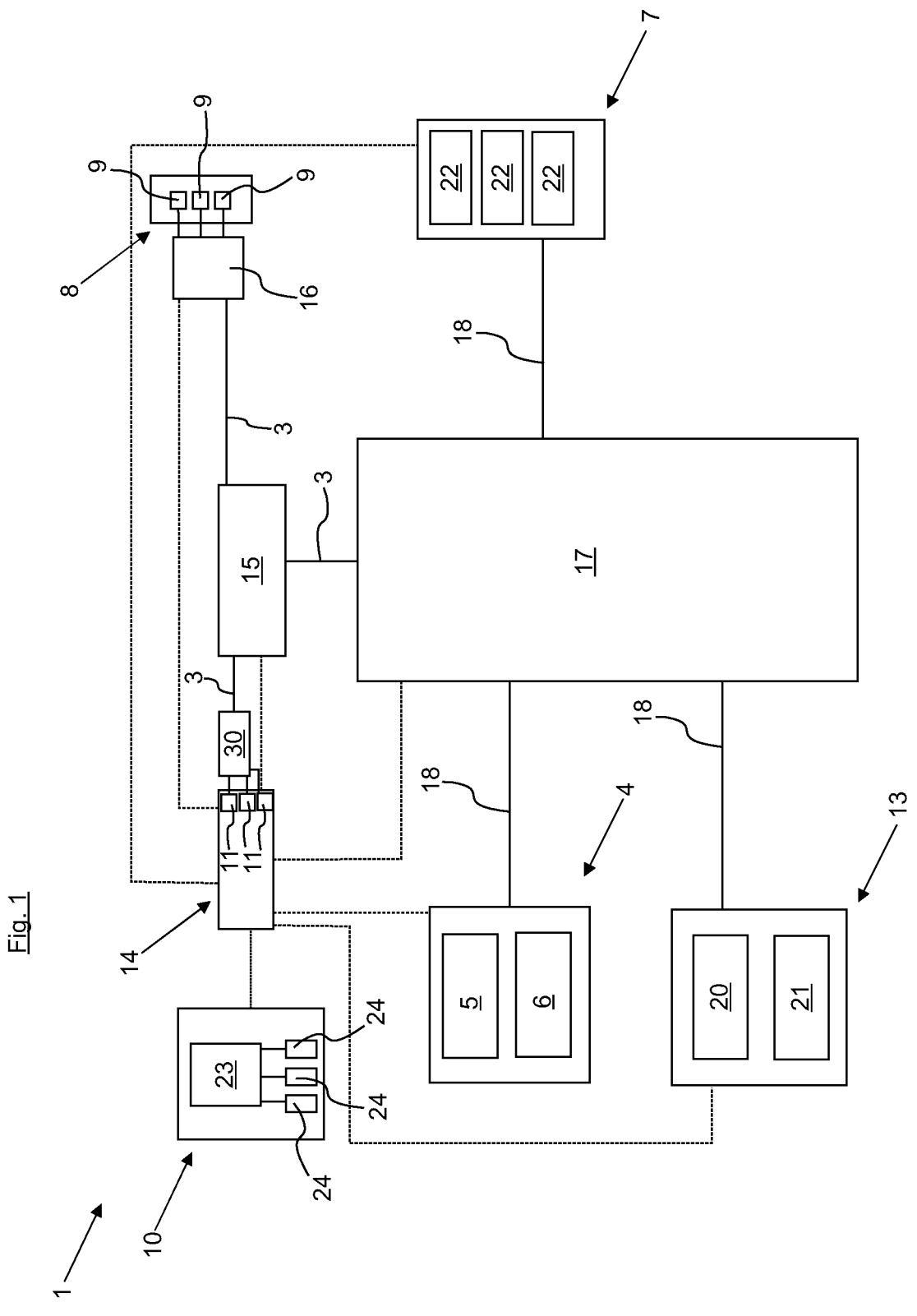

(58) Field of Classification Search
    CPC ....... B63G 8/38; B63G 2008/004; H02J 3/14;
                        G06V 20/05; G03B 17/08
    See application file for complete search history.

(56)                   References Cited

U.S. PATENT DOCUMENTS

| | | | | |
|---|---|---|---|---|
| 10,380,751 | B1 * | 8/2019 | Jones | H04N 23/16 |
| 2002/0071174 | A1 * | 6/2002 | Chezar | G02B 21/0004 |
| | | | | 359/368 |
| 2003/0115242 | A1 * | 6/2003 | Hayduk | G06F 1/3293 |
| | | | | 718/103 |
| 2004/0205074 | A1 * | 10/2004 | Berkery | G06F 9/46 |
| 2006/0265397 | A1 * | 11/2006 | Bryan | G06N 5/02 |
| 2007/0162678 | A1 | 7/2007 | Yang et al. | |
| 2007/0207831 | A1 * | 9/2007 | Tinsley | G06F 13/4004 |
| | | | | 455/556.1 |
| 2007/0291124 | A1 * | 12/2007 | Staudacher | G06F 9/542 |
| | | | | 348/207.99 |
| 2008/0071483 | A1 * | 3/2008 | Eaves | H04Q 9/00 |
| | | | | 429/90 |
| 2014/0212142 | A1 * | 7/2014 | Doniec | H04B 13/02 |
| | | | | 398/104 |
| 2015/0117716 | A1 * | 4/2015 | Ursin | G01V 1/3835 |
| | | | | 382/106 |
| 2016/0214693 | A1 * | 7/2016 | Habeger | B63G 8/20 |
| 2017/0085864 | A1 * | 3/2017 | Yang | G06T 7/521 |
| 2017/0103027 | A1 * | 4/2017 | Olmstead | G06F 13/4068 |
| 2017/0219551 | A1 * | 8/2017 | Kharkar | G01D 11/30 |
| 2017/0253313 | A1 * | 9/2017 | Easterling | B63G 8/001 |
| 2017/0369137 | A1 * | 12/2017 | Smith | G05D 1/0875 |
| 2018/0001981 | A1 * | 1/2018 | Boss | B63G 8/08 |
| 2018/0099733 | A1 * | 4/2018 | Sato | H04B 11/00 |
| 2018/0172855 | A1 * | 6/2018 | Drange | G08C 19/00 |
| 2018/0232959 | A1 | 8/2018 | Thornburg et al. | |
| 2019/0103960 | A1 * | 4/2019 | Viswanathan | H04L 12/66 |
| 2019/0127034 | A1 * | 5/2019 | Larson | G01S 17/08 |
| 2019/0246060 | A1 * | 8/2019 | Tanabe | H04N 23/63 |
| 2019/0334380 | A1 * | 10/2019 | Koyanagi | B60L 53/52 |
| 2019/0351985 | A1 * | 11/2019 | Adamson | B63C 11/48 |
| 2020/0141816 | A1 * | 5/2020 | Sanger | G01C 9/02 |
| 2021/0166733 | A1 * | 6/2021 | Miwa | H04N 5/77 |

OTHER PUBLICATIONS

Anonymous, "Symmetric multiprocessing," Wikipedia, May 2, 2019, XP055713611.
Anonymous, "Multi-core processor," Wikipedia, May 4, 2019, XP055713616.
Anonymous, "Processor affinity," Wikipedia, Apr. 28, 2018, XP055513315.

* cited by examiner

UNDERWATER DEVICE FOR ACQUIRING IMAGES OF A WATER BOTTOM

The invention relates to an underwater device for capturing images of a seabed with multiple electrical function units, a control program for controlling an electrical function unit, another control program for controlling another electrical function unit, and at least one control device.

There exists a need to monitor marine and freshwater ecosystems from both an economic and ecological perspective. One challenge in monitoring ecosystems is that, on the one hand, a fine spatial resolution is needed to capture the high diversity of organisms with sufficient accuracy and, on the other hand, a large area must be examined.

Underwater devices are known from the prior art which have a camera and by means of which images of the seabed are captured. For underwater devices, the amount of data to be processed is very large. In particular, data is continuously collected by sensors of the underwater device and processed by further components of the underwater device. In addition, images of the seabed are captured, which also results in a large amount of data to be processed. It is problematic that, due to the large amount of data, processing the data and accordingly examining the seabed takes a long time.

In addition, depending on the intended use and/or location of the underwater device, the amount of data to be processed and/or the computing power required may increase. This can result from the fact that further sensors are connected and/or more computing power is required due to other data processing methods.

Arjun Chennu Et Al "A diver operated hyperspectral imaging and topographicsurveying system for autmated mapping of benthic habitats", Scientific Reports, Bd. 7, No. 1, Aug. 2, 2017 (2017-08-02), XP055660413, DOI: 10.1038/s41598-017-07337-y discloses an underwater device by means of which images were captured of a seabed. For this purpose, the underwater device has, among other things, a hyperspectral camera, sensors and a computer.

One object of the invention is therefore to provide an underwater device by means of which the seabed can be examined more quickly.

The object is achieved by an underwater device of the type mentioned at the outset, characterised in that the underwater device is designed such that the control program and the other control program are selectively executable on the same control device or the control program is executable on one control device and the other control program is executable on another control device.

The underwater device according to the invention has the advantage that by executing the control programs on the same control device or on different control devices, it is possible to react in a flexible manner to the amount of data to be processed. In this way, the control programs can be executed on the same control device if the amount of data to be processed is manageable by one control device. In contrast to the underwater devices known from the prior art, in which there is only a single control device, in the embodiment according to the invention the control programs can be executed on different control devices if the amount of data to be processed is too large for a single control device and thus the time required for data processing would be too long.

As a result, the user can flexibly respond to the particular location and intended use of the underwater device and provide an underwater device with a single control device or multiple control devices. This is possible because the electrical function units can perform their function regardless of which control device is running their control program.

As a result, the underwater device can be retrofitted with further control devices as required. This is possible because the design of the underwater device, described in more detail below, makes it possible to connect one or more control devices at any time. In this regard, it is irrelevant whether the underwater device already has a single control device or several control devices before the further control device or control devices is/are connected. This distinguishes the underwater devices from the known control devices where such a connection of further control devices is not possible. In particular, with the known underwater devices, the computer capacity depends on the control device used. In contrast, the computer capacity of the underwater device according to the invention can be adapted to the corresponding place of use and/or purpose of use.

This is possible, as described above, by using an underwater device for capturing images of a seabed with multiple electrical function units, a control program for controlling one electrical function unit, another control program for controlling another electrical function unit, characterised in that the underwater device is designed such that the control program and the other control program are selectively executable on the same control device or the control program is executable on one control device and the other control program is executable on another control device.

An electrical function unit is a component or physical unit of the underwater device which realises a technical function of the underwater device. Thus, as will be described in more detail below, the technical function can be capturing images of the seabed and/or determining the position of the underwater device and/or acquiring sensor values.

The control program is a computer program by means of which the respective electrical function unit is controlled in order to realise its technical function. The control device and the other control device can be located within a cavity arranged through a housing of the underwater device.

In operation, the underwater device can be arranged partially or completely in the water. To examine the seabed, it is advisable that the underwater device is fully immersed in the water. The underwater device can be used to study marine and freshwater ecosystems.

In a particular embodiment, the electrical function units of the underwater device can communicate with each other using a message-based communication protocol. In particular, the electrical function unit can communicate with the other electrical function unit using a message-based communication protocol.

The use of a message-based communication protocol offers the advantage that the electrical function units do not need to know the address, in particular IP address, of the other electrical function unit in order to communicate with each other. This means that it is not necessary for the electrical function unit and/or the other electrical function unit to be connected to a data bus via a fixed connection interface in order for communication to be possible between the electrical function units. Due to the use of the message-based communication protocol, the electrical function unit and/or the other electrical function unit in the underwater device can be connected to the data bus at any points on the underwater device. For example, when installing further electrical function units, it can be necessary to place the function units that are already present and connected to the data bus at a different location on the underwater device, which is easily possible with the underwater device according to the invention.

Another advantage of using the message-based communication protocol is that it can easily ensure that the control devices can communicate with each other. In particular, it is not necessary for the control devices to know the IP address of their respective communication partner. In this respect, there is flexibility as to which control device executes which control program and/or there is flexibility as to the number of control programs that are executed on the same control device.

A data bus has at least one line by means of which data can be exchanged bidirectionally between the electrical function units connected to the data bus. Several electrical function units of the underwater device can exchange data via the same data lines of the data bus. This distinguishes the design according to the invention from a design of a known computer in which the control device is connected to another component, such as a sensor, via a point-to-point connection. Thus, in the case of the computer, no other components can communicate via the same data line as the control device and the other component due to the point-to-point connection. Furthermore, in the underwater device according to the invention, further electrical function units, which for example have sensors, can be connected to the data bus as required. As a result, the underwater device can be configured as needed.

The data connection of the electrical function units by means of the data bus offers the advantage that a network can be implemented in the underwater device in which one or more control devices can be used for data processing as required. This is particularly advantageous if further sensors are to be connected and/or another more time-consuming data processing method is to be executed. In this way, the number of control devices required for fast data processing can be added to the network. The network can be an Ethernet network.

It is particularly advantageous if the communication protocol used for data communication has a publish/subscribe mechanism. In particular, the communication protocol used in data communication can comprise the Message Queue Telemetry Transport Protocol (MQTT). This ensures in a simple manner that the electrical function units of the underwater device do not need to know the address, in particular IP address, of their respective communication partner in the underwater device.

The message-based communication protocol allows the electrical function unit and/or the other electrical function unit to publish information, which can be a message, in at least one data channel. It is particularly advantageous if different types of information, especially message types, such as alarm messages or action messages, are published in different data channels.

Furthermore, the message-based communication protocol allows the electrical function unit and/or the other electrical function unit to receive information, in particular a message, from at least one data channel.

It is particularly advantageous if the control device, in particular a control program executed on the control device, publishes the information of the electrical function unit and/or the other electrical function unit in the data channel. In an alternative embodiment of the underwater device, the control device, in particular a control program executed on the control device, can publish the information of the electrical function unit in the data channel and the other control device; in particular another control program executed on the control device, can publish the information of the other electrical function unit in the data channel.

Furthermore, the control device, in particular a control program executed on the control device, can receive the information of the electrical function unit and/or the other electrical function unit from the data channel. In an alternative embodiment, the control device, in particular a control program executed on the control device, can receive the information of the electrical function unit from the data channel and the other control device; in particular another control program executed on the other control device, can receive the information of the other electrical function unit from the data channel.

For example, sensor values determined by a sensor unit can be published in the data channel. The published sensor values can be received by function units that have subscribed to the data channel.

The communication described above can be realised particularly easily if the underwater device has a control centre that manages the information, in particular a message, published in the data channel, or messages published in the data channels. In particular, the control centre can manage the messages published by the electrical function unit and/or the messages published by the other electrical function unit in the data channel.

In addition, the control centre can be designed to make the messages published in the data channel available for retrieval. Retrieval of messages can be performed by receiving means subscribed to the data channel. The control device and the other control device may each have a receiving means. The control device and the other control device may have subscribed to different data channels. In addition, the control device or the other control device may have the control centre.

In a particular embodiment, the electrical function unit and the other electrical function unit can be directly connected to the control device in a data-transmitting manner when the control program and the other control program are executed on the control device. In an embodiment in which the control program is executed on the control device and the other control program is executed on the other control device, the electrical function unit can be directly connected to the control device in a data-transmitting manner and the other electrical function unit can be directly connected to the other control device in a data-transmitting manner.

Direct connection means that there is no device between the electrical function unit and the control device. Furthermore, the control program cannot control the respective electrical function unit until the control device is connected to the respective electrical function unit. The user of the underwater device can start the control program on the control device before the electrical function unit to be connected to the control device is put into operation for the first time. After the control program is started, it detects when an associated electrical function unit is connected to the control device.

The electrical function unit and/or the other function unit can be directly connected to the control device by means of a data line. In an alternative embodiment, the function unit can be directly connected to the other control device by means of a data line. In the alternative embodiment, the other function unit can be directly connected to the other control device in a data-transmitting manner by means of a data line. The data line can be a USB line. Alternatively, the electrical function unit and the other function unit can be connected to the control device or the other control device in a data-transmitting manner using TTL, RS232, I2C, etc.

The control device and the other control device can be connected to each other in a data-transmitting manner by means of a data bus. As a result, the control device and the other control device can easily form a network in which data can be exchanged. The control device and/or the other control device can each have a processor. The control device and the other control device are designed as separate physical units. This means that the control device and the other control device can be connected separately to the data bus and/or do not have the same circuit board. The control device and/or the other control device can each have at least one processor.

The data-transmitting connection can be realised by a plug-in connection. Thus, the control device can be connected in a data-transmitting manner to the other control device and/or the data bus by means of a plug-in connection. Furthermore, the electrical function unit and/or the other electrical function unit can be connected to the control device or the other control device by means of a plug-in connection.

The data-transmitting connection can be designed to be releasable. This is advantageous because a defective control device and/or function unit and/or other function unit can thus be easily replaced.

The control device and/or the other control device can be connected to the data bus at any connection interface of the underwater device without this having a negative influence on the communication of the electrical function unit and/or the other function unit. It is particularly advantageous if a switch is provided that has several connection interfaces. In this case, the control device and/or the other control device can be connected to the network of the underwater device by means of the switch.

In a particular embodiment, an electrical function unit can be an image capture unit, in particular one designed in a modular fashion. The image capture unit can have a hyperspectral camera. Furthermore, the image capture unit can have a colour camera, in particular an RGB camera. Both the colour camera and the hyperspectral camera capture images of the seabed. The hyperspectral camera and the reference camera each function as a data acquisition unit.

A hyperspectral camera is a camera that captures multispectral data in very narrow spectral bands of visible light, near infrared and mid infrared. Hyperspectral cameras thus allow high spectral resolution of object-specific signatures in more than 15, but generally in 30-200 contiguous channels, enabling documentation of a nearly continuous spectrum for each image element.

The colour camera, especially RGB camera, is not a hyperspectral camera. The colour camera differs from the hyperspectral camera in that it has fewer channels than the hyperspectral camera, in particular exactly three channels. Accordingly, with a colour camera, the viewed object cannot be spectrally resolved as high as with a hyperspectral camera.

The underwater device can map the seabed based on the images captured. Compared to previous underwater devices, the underwater device according to the invention enables a very precise examination of the seabed.

The image capture unit can be directly connected in a data-transmitting manner to the control device or the other control device, in particular by means of the data line.

In a particular embodiment, an electrical function unit can be a position determination unit, in particular of modular design, for determining a position of the underwater device. The position determination unit can have position determination means that acquire data to determine the actual position of the underwater device, thus acting as a data acquisition unit.

The position determination unit can be directly connected in a data-transmitting manner to the control device or the other control device, in particular by means of the data line.

In addition, an electrical function unit can be a sensor unit, in particular a modular sensor unit, which has at least one sensor. The position determination unit and the sensor unit can communicate with each other in the manner described above. In addition, they can also communicate with the image capture unit in the manner described above. The sensor unit can be directly connected to the control device in a data-transmitting manner, in particular by means of the data line.

The modular design of the individual components of the underwater device offers the advantage that the individual components can be easily installed and removed. In particular, the respective components can be installed or removed as a whole due to the modular design.

Alternatively, the sensor unit can be directly connected to the other control device in a data-transmitting manner, in particular by means of the data line. In this embodiment, the sensor can be directly connected to the other control device in a data-transmitting manner.

The other control device can process the data acquired by the sensors of the control unit. In addition, the other control device can perform computational operations for other components of the underwater device. A modularly designed sensor unit has the advantage that it can be easily installed or removed. In this way, all components of the sensor unit can be installed in or removed from the underwater device together.

The underwater device can have an electrical energy source for supplying electrical energy to the electrical function units. The electrical energy source can have a plurality of batteries and/or be of modular design. The modular formation has the advantage that the energy source can be easily replaced. In this case, the energy source can be connected to a housing of the underwater device in a releasable manner. In particular, the energy source can be mounted on and/or in the housing. The connection can be mechanical and/or electrical. The energy source can be connected directly to the housing in a form-fitting and/or force-fitting manner. In particular, it can thus be prevented in an advantageous manner that the electrical consumers of the underwater device are supplied with electrical energy via a power cable going from the underwater device to, for example, a ship. As a result, the integrated arrangement of the energy source on and/or in the housing enables easy maneuverability of the underwater device and/or the underwater device is designed to be compact.

The electrical energy source can have a battery control device for monitoring the battery condition. This makes it easy to identify defective batteries. In addition, the electrical energy source can include have means for cooling the battery control device and/or battery sensors. The battery temperature can be measured using the battery sensors.

In a particular embodiment, an electrical function unit can be an electrical display device. The position determination unit, the sensor unit and the electrical display device can communicate with each other in the manner described above. In addition, they can also communicate with the image capture unit in the manner described above. The electrical display device can be directly connected to the control device in a data-transmitting manner, in particular by means of the data line.

The electrical display device can have a screen display and offers the advantage that an operating state of the underwater device and/or captured images of the seabed can be easily visually displayed to the diver.

In a particular embodiment, an electrical function unit can be an energy distribution unit for distributing electrical energy between the electrical energy source and at least one electrical consumer. The position determination unit, the sensor unit, the electrical display device and the energy distribution unit can communicate with each other in the manner described above. In addition, they can also communicate with the image capture unit in the manner described above. The energy distribution unit can be directly connected in a data-transmitting manner to the control device or the other control device, in particular by means of the data line.

The other control device can be connected to the switch in a data-transmitting manner by means of the data bus. The switch can also be connected to the control device in a data-transmitting manner by means of the data bus. Further electrical function units can be easily connected to the data bus by means of the connection interfaces provided in the switch.

Electrical consumers are components of the underwater device that have electronic components and can therefore be damaged if they come into contact with water and/or humidity of the air surrounding them is too high. Thus, the electrical function unit and the other electrical function unit have electrical consumers.

The energy distribution unit can have at least one other sensor that is connected to the other control device in a data-transmitting manner. By means of the other sensor, the current supplied to the electrical consumer or the voltage applied to an electrical energy source or to the electrical consumer can be determined.

Alternatively, the sensor of the sensor unit and/or the other sensor of the energy distribution unit can be used to detect a temperature or a humidity or a pressure within a cavity of the underwater device. In an underwater device with with multiple sensors and/or multiple other sensors, the current and/or the temperature and/or the humidity and/or the pressure can be measured by means of the sensors and/or the other sensors.

Thereby, based on the sensor value detected by the sensor and/or the sensor value detected by the other sensor, it can be determined whether a hazardous condition exists for an electrical consumer, and the energy distribution unit can disconnect the electrical consumer from the electrical energy source if a hazardous condition exists. This has the advantage of actively checking whether a hazardous condition exists in which an electrical consumer can be damaged. The determination as to whether a hazardous condition exists can be made by the control device or the other control device that is directly connected in a data-transmitting manner to the energy distribution unit by means of the data line.

In the event that it is determined that a hazardous condition exists, damage to the electrical consumer can be prevented by the energy distribution unit disconnecting the electrical connection between the electrical energy source and the electrical consumer. In this way, the risk of the electrical consumer being damaged if water enters a cavity of the underwater device in which the electrical consumers are located, for example due to leakage, and/or if the humidity in the underwater device is too high, is reduced.

The energy distribution unit is used to distribute the electrical energy provided by the electrical energy source to the electrical consumers. Accordingly, the energy distribution unit enables the electrical consumer to be supplied with electrical energy.

The energy distribution unit can have a switching device by means of which the electrical connection between the electrical energy source and the electrical consumer can be disconnected. The switching device can have a number of switches by means of which the electrical consumers can be disconnected from the electrical energy source separately and/or independently of one another. As a result, the electrical connection between the electrical energy source and the electrical consumer can be easily disconnected by the other control device directly connected to the energy distribution unit. In particular, the other control device can set the switch position of the switch accordingly to establish or disconnect an electrical connection between the electrical energy source and the electrical consumer. The number of switches can correspond to the number of electrical consumers.

In a particular embodiment, the energy distribution unit can generate a switch-off message and the switch-off message can be transmitted to the electrical consumer prior to a disconnection of the electrical connection between the electrical energy source and the electrical consumer. This prevents the electrical consumer from being switched off abruptly. The electrical consumer thus still has time to take precautions, for example, to avoid a loss of data. Thus, after receiving the switch-off message, the electrical consumer can cause the processing to be stopped and any intermediate results to be saved.

It is advantageous if the energy distribution unit waits for a predetermined period of time after the switch-off message has been transmitted before the electrical connection between the electrical energy source and the electrical consumer is disconnected. As previously explained, the electrical consumer can thus be given time to complete the processing operation and/or to store any intermediate results.

Alternatively or additionally, the energy distribution unit can wait for feedback from the electrical consumer after transmitting the switch-off message before disconnecting the electrical connection between the electrical energy source and the electrical consumer. In this case, it is ensured that the processing operation is completed and/or any intermediate results are stored because the electrical connection between the electrical energy source and the electrical consumer is not disconnected until the feedback information has been received.

Alternatively or additionally, the energy distribution unit can wait, after transmitting the switch-off message, until a current through the electrical consumer has fallen below a predefined threshold value before the electrical connection between the electrical energy source and the electrical consumer is disconnected. By examining the current, the energy distribution unit, in particular the control device of the energy distribution unit, can determine whether processing operations are still taking place in the electrical consumer. Therefore, it is ensured that the electrical disconnection of the electrical consumer from the electrical energy source is only performed when the electrical consumer has completed all processing operations.

The control device or the other control device can examine the acquired sensor value to determine whether a hazardous condition exists. In this respect, the other control device can determine a hazardous condition if the detected sensor value deviates from a predefined or predefinable limit value or lies outside a limit range. In particular, the acquired sensor value may be above a limit value and/or outside a limit range when the hazardous condition exists. In this regard, the control device or the other control device can generate an alarm message if a hazardous condition exists. The alarm message can be queued and processed by the energy distribution unit as part of a processing procedure, as described in more detail below.

It is particularly easy to determine a hazardous condition if the current supplied to the electrical consumer or the voltage applied to the electrical energy source or to the electrical consumer is determined by means of the sensor and/or the other sensor. The control device or the other control device can infer whether a hazardous condition exists by examining the current and/or voltage.

In this regard, the control device or the other control device can cause current values to be acquired for a predetermined first time period and a predetermined second time period, respectively. In this regard, the second time period is longer than the first time period. To determine whether the electrical consumer should be disconnected from the electrical energy source, the current values acquired during the first time period can be used.

Using the current values recorded during the first time period offers the advantage that deviations can be detected more quickly and thus a hazardous condition can be inferred more quickly than if the current values recorded during the second time period are used. In contrast, the current values recorded during the second time period are more suitable for evaluation than the current values recorded during the first time period.

In a particular embodiment, the underwater device can have a control unit that is electrically connected to the energy distribution unit. Using the control unit, the diver can enter commands for the underwater device. Thus, by operating the control unit, the energy distribution unit can cause the electrical connection between the electrical consumer and the electrical energy source to be established or disconnected, or the electrical consumer and/or the electrical display device to be switched to a sleep mode, or the electrical consumer and/or the electrical display device to be switched to an energy saving mode. The diver can select the desired operating state from the aforementioned operating states of the underwater device by actuating the control unit for different lengths of time.

In sleep mode, the electrical consumers are not shut down, but are transferred to a state in which they require little electrical energy. In sleep mode, the electrical consumers are transferred to a mode in which they cannot perform their technical function, but the electrical consumers are not switched off. In this mode, the electrical consumers can be transferred from sleep mode to functional mode more quickly than from the switched-off state. Sleep mode is useful when the capture of images of the seabed using the underwater device is not required and, for example, the underwater device is to be transferred from one position to another. As a result, the operating time of the underwater device can be extended due to the energy savings when operating in sleep mode.

In the energy saving mode, the consumption of electrical energy of the electrical consumer and/or the electrical display device is reduced. In this regard, the brightness of the electrical display device can be reduced in energy saving mode. As a result, the operating time of the underwater device can be extended due to the energy savings when operating in energy saving mode.

The control unit can be integrated into the display device. The control unit can have control buttons that are arranged on a housing of the display device. The diver can thus enter the commands directly via the control buttons. This is advantageous because it is difficult to enter commands under water and therefore simple input options are needed.

When a hazardous condition is detected, the energy distribution unit cannot electrically disconnect the display device from the electrical energy source. This offers the advantage that the hazardous condition can be immediately indicated to the diver. In addition, recommendations for the next steps, such as surfacing, can be given to the diver via the display device to prevent damage to the electrical consumers of the underwater device. Alternatively, it is possible for the energy distribution unit to disconnect the display device from the electrical energy source when a hazardous condition exists.

In a particular embodiment, the underwater device can have a lighting device, in particular an LED display, for indicating the operating state of the underwater device. The lighting device can have at least one lighting means, in particular an LED. The lighting device is advantageous because visibility underwater is often poor, so the diver can be easily informed of the operating state of the underwater device by the lighting device. In this manner, the operating state can be easily indicated by different colour schemes of the LED and/or brightness and/or by flashing.

The energy distribution unit can perform different tasks. The individual tasks can be prioritised differently. This means that the energy distribution unit processes the tasks with higher prioritisation faster than tasks with lower prioritisation. By prioritizing accordingly, it can thus be ensured that alarm messages are processed quickly by the energy distribution unit.

The energy distribution unit can optionally perform a communication task or a current monitoring task or an energy control task for controlling the operating state of the underwater device or a processing task for processing messages, in particular or a signalling task. The individual tasks are described in more detail below.

Performing the communication task enables the components, such as electrical consumers, of the underwater device to communicate with each other or with external devices in a data-transmitting manner. In particular, performing the communication task can enable the energy distribution unit to communicate with the electrical consumer in a data-transmitting manner. In doing so, upon receipt of a message, the energy distribution unit can respond to the message immediately, such as a request for the time of day, or the energy distribution unit can queue the message for processing when performing the processing task described below.

The energy distribution unit communicates with the electrical consumer by publishing a message in a data channel, as described above. This means that the message is available to the receiving means or all receiving means subscribed to the data channel. Thus, the energy distribution unit can receive the message when a receiving means of the energy distribution unit subscribes to the data channel. The receiving means can only receive messages from data channels to which they have subscribed.

Thus, the image capture unit can transmit a message into another data channel to indicate that an image capture process is to take place. The other control device directly connected to the energy distribution unit receives the message and causes an illumination of the underwater device to be turned off to prevent the illumination light from being acquired by the image capture unit.

In addition, control messages can be transmitted to the energy distribution unit when the communication task is carried out. In this way, a control message can be transmitted that an image capture process is to take place. The energy distribution unit causes the electrical connection between the electrical consumer, in particular the electrical consumer of the image capture unit, and the energy source to be closed. This makes it easy to ensure that only those electrical consumers that are actually needed are electrically connected to the energy source.

When performing the current monitoring task, the energy distribution unit can determine current values for a predetermined first time period and for a predetermined second time period, as described above. In this case, based on the current values determined in the first time period, it is determined whether a hazardous condition exists. In addition, when the current monitoring task is carried out, it is checked whether the respective electrical consumer is switched on or off by determining the current. Also, when performing the current monitoring task, it can be determined if there is a short circuit. This is the case when a current value is detected that is above a predefined threshold.

When performing the energy control task, the operating state of the underwater device is set. This is done by monitoring whether a control unit is actuated. As a result of the actuation, the electrical connection between the electrical consumer and the electrical energy source can be established in a switch-on mode or disconnected in a switch-off mode or the electrical consumer and/or the electrical display device can be transferred to the sleep mode or the electrical consumer and/or the electrical display device can be transferred to the energy saving mode.

When the processing task is carried out, the messages in the queue can be processed. A distinction can be made between alarm messages and action messages.

Alarm messages are messages that signal a hazardous condition so that the electrical connection between the electrical energy source and the electrical consumer should be disconnected by means of the energy distribution unit. Action messages contain information for the receiver about what action will be taken, such as switching off the receiver. The recipient can take further steps based on this information, such as storing data.

In the event that the control device or the other control device determines that the humidity in the cavity detected by the sensor and/or the other sensor is above the limit, an alarm message is published in the data channel. The receiving means of the energy distribution unit receives the alarm message and places it in the queue. In the processing mode of the energy distribution unit, the alarm message is processed. During processing, the electrical consumer is disconnected from the electrical energy source and the hazardous condition can be displayed on the electrical display device.

In the event that the control device or the other control device determines that the pressure in the cavity detected by the sensor and/or by the other sensor rises above a predetermined limit, for example, it is assumed that there is a leak and an alarm message is output in the data channel. After receiving the alarm message and placing it in the queue, it is processed by the energy distribution unit. This causes the electrical consumers to be disconnected from the energy source and it can be indicated to the diver to stop diving deeper to prevent more water from entering the cavity of the underwater device.

When executing the processing task, alarm messages generated by the control device of the energy distribution unit can also be processed. These alarms can be generated when it is determined that a hazardous condition exists based on the detected current values.

When performing the signalling task, the status of a lighting means can be checked. In this regard, it is possible to set whether at least one lighting means is illuminated or not when carrying out the signalling operation. The setting of the lighting condition of the lighting means can be dependent on the operating state of the underwater device and/or the presence of a hazardous condition.

In a particular embodiment, the underwater device can be designed such that it is manually controllable and/or operable and/or portable. This means that the underwater device is not controlled remotely by a ship, but solely by the diver. The underwater device can be designed without a propeller. This means that the underwater device is propelled solely by the diver. The underwater device thus does not have a drive motor to drive the underwater device.

Of particular advantage is an underwater device that is a diver-operated underwater device. Diver-operated underwater device means a device that can be operated by a diver in or under water. This means that the diver can move the underwater device in or under the water and thus move it to the desired position to capture the desired area of the seabed. In addition, the diver can operate the underwater device in or under water, in particular enter corresponding commands to capture images of the seabed.

Alternatively, the underwater device can be an autonomous underwater vehicle. With this design, the underwater device no longer needs to be moved by the diver to capture images of the seabed. The underwater vehicle can be controlled autonomously.

Furthermore, the underwater device can be a cable-guided underwater vehicle (remotely operated vehicle). With this design, the underwater device no longer needs to be moved by the diver to capture images of the seabed. The underwater vehicle can be controlled by a person on the ship.

Figure 2:
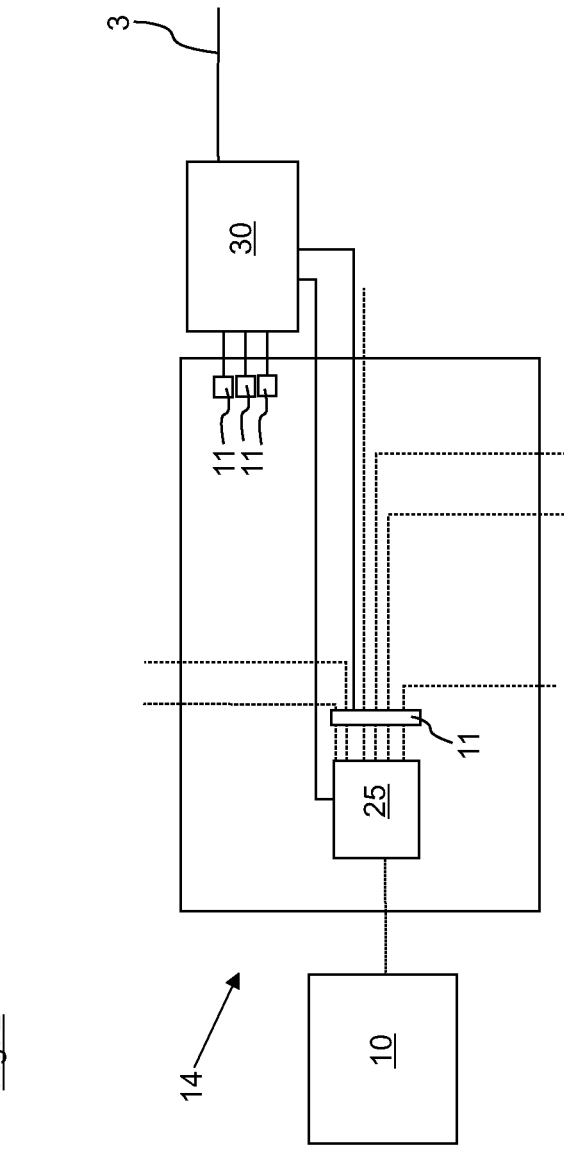
Figure 3:
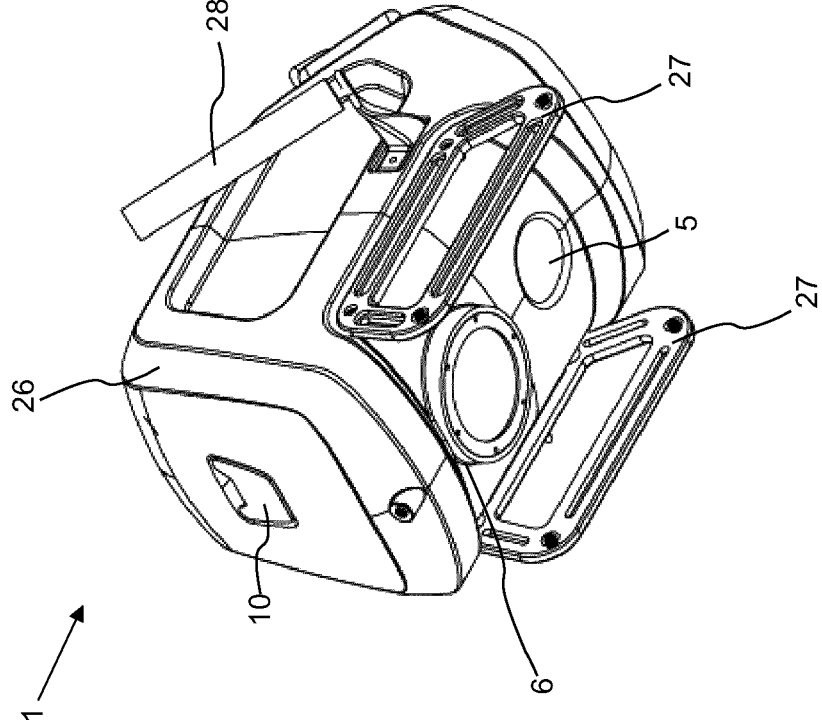
Figure 4:
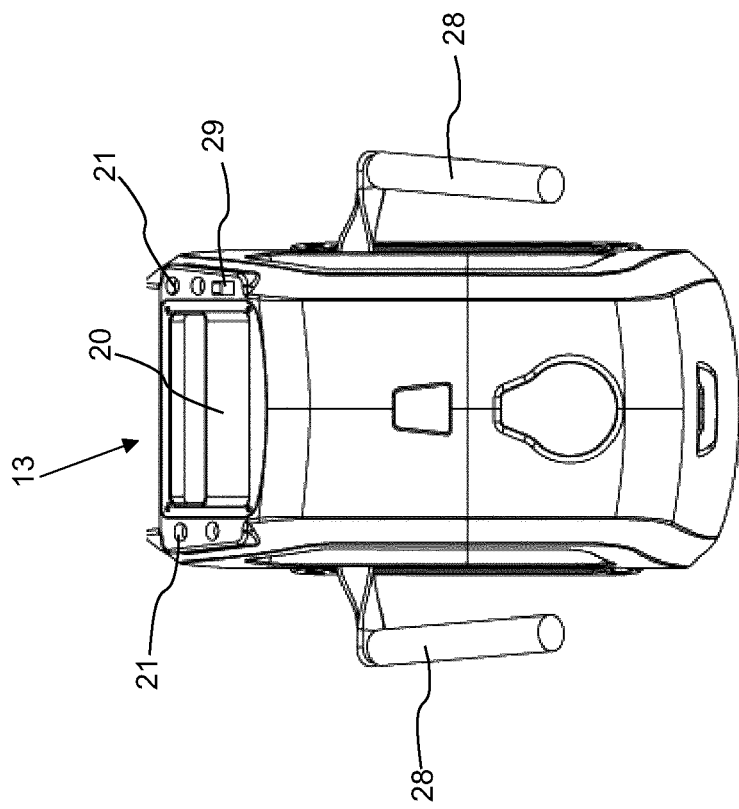
Figure 5:
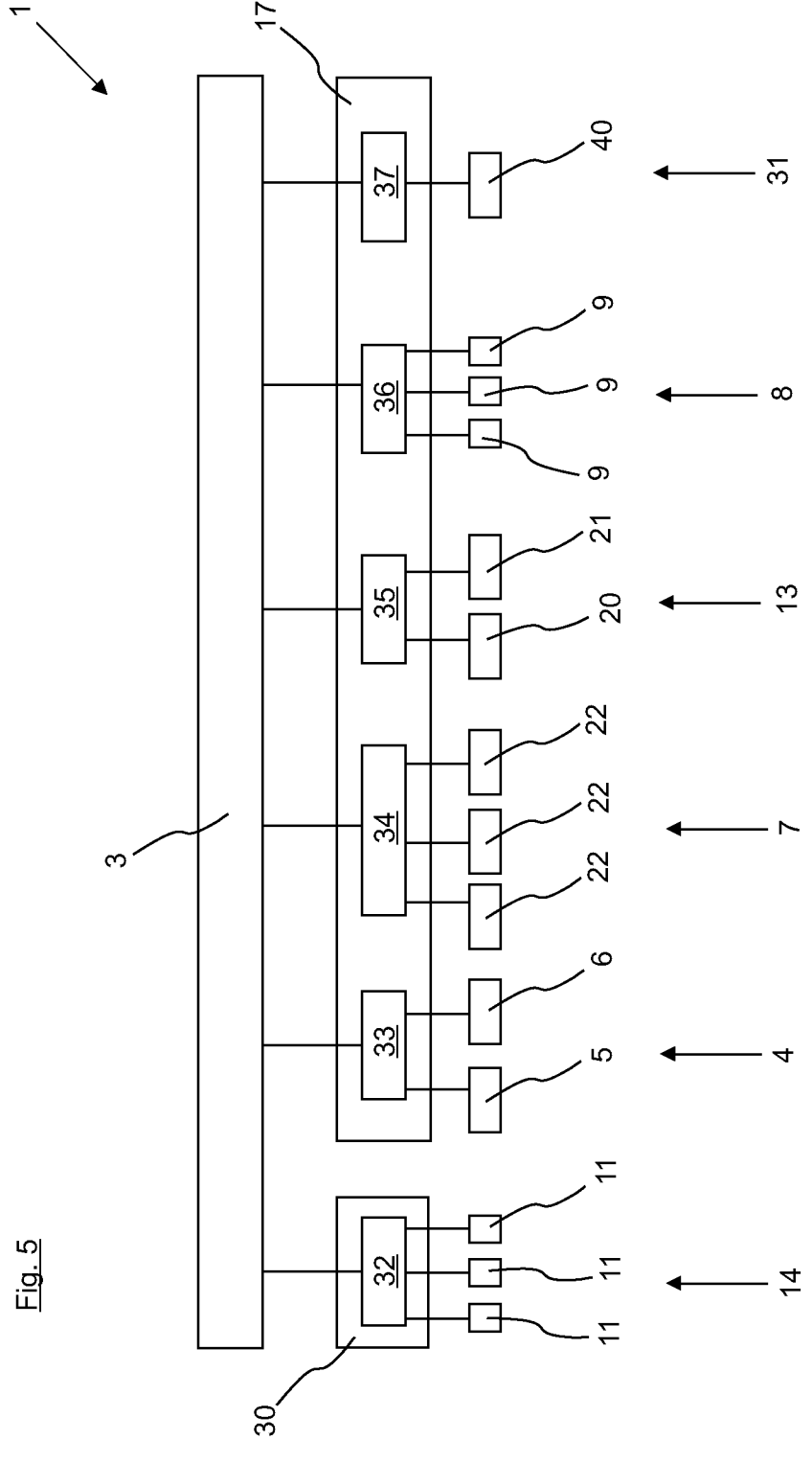
Figure 6:
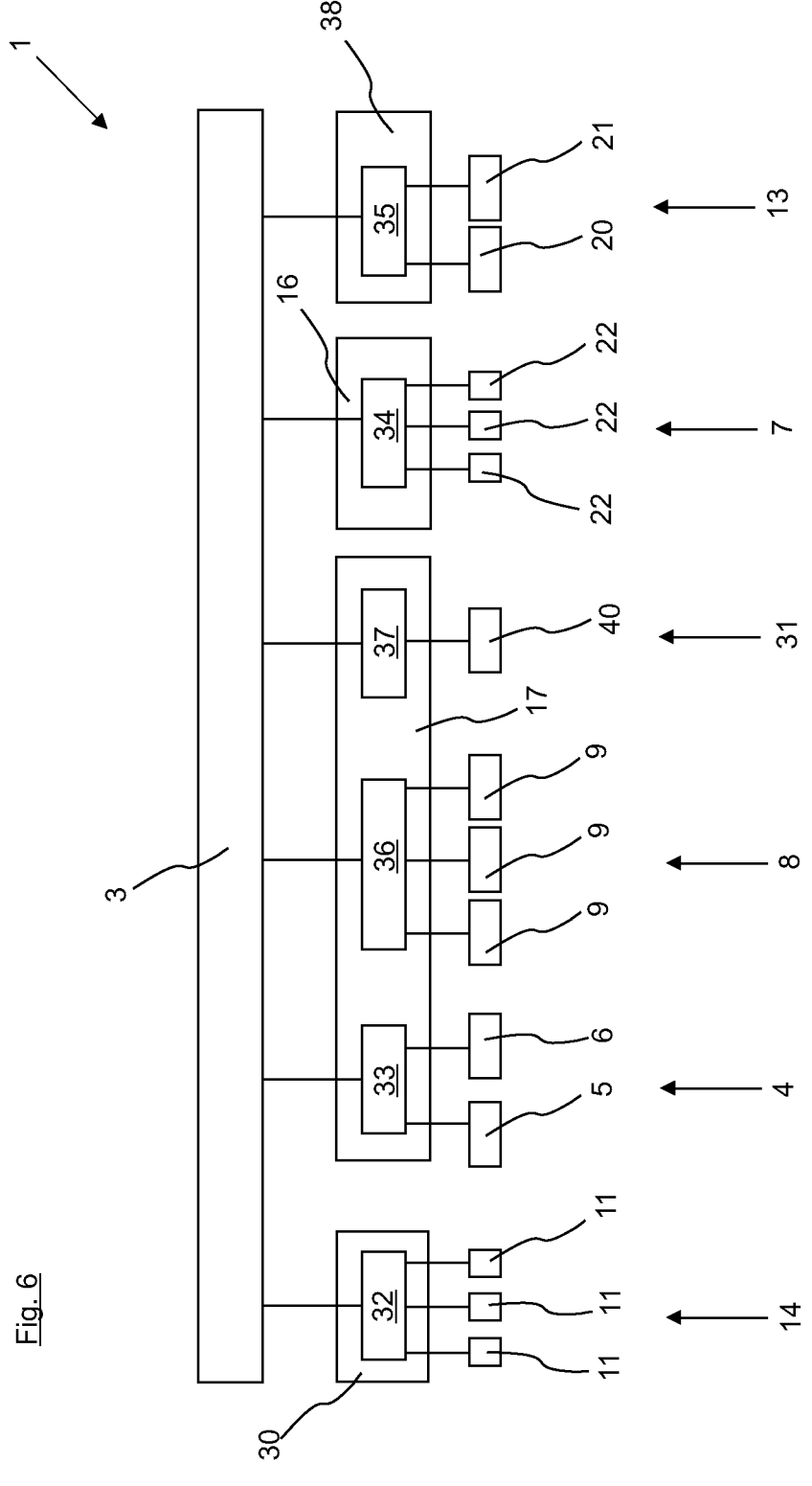

The subject matter of the invention is shown schematically in the figures, wherein elements that are the same or have the same effect are mostly provided with the same reference symbols. In the figures:

FIG. 1 shows a design of a diver-operated underwater device according to the invention in a first embodiment with electrical function units, FIG. 2 shows the design of an energy distribution unit, FIG. 3 shows a perspective view of the underwater device according to the first embodiment, FIG. 4 shows a top view of the underwater device according to the first embodiment, FIG. 5 shows a design of a diver-operated underwater device according to the invention in a second embodiment, FIG. 6 shows a design of a diver-operated underwater device according to the invention in a third embodiment.

The underwater device 1 shown in FIG. 1 for capturing images of a seabed is a diver-operated underwater device and has multiple electrical function units. Alternatively, the underwater device 1 can be an autonomous underwater vehicle or a cable-guided underwater vehicle.

Here, the underwater device 1 has an image capture unit 4, a position determination unit 7, an energy distribution unit 14, an display device 13 and a sensor unit 8 as electrical function units. Furthermore, the underwater device 1 has three control devices, namely a control device 17, a first other control device 16 and a second other control device 30.

In the embodiment shown in FIG. 1, control programs for respectively controlling the image capture unit 4, the position determination unit 7 and the display device 13 are executed by the control device 17. A control program for controlling the sensor unit 8 is executed on the first other control device 16, and a control program for controlling the energy distribution unit 14 is executed on the second other control device 30. However, the underwater device 1 is designed in such a way that, in the event that the power of the control device 17 is not sufficient to process the data, at least part of the control programs for controlling the image capture unit 4, the position determination unit 7 and the display device can be executed on other control devices not shown.

The image capture unit 4 has a hyperspectral camera 5 and a colour camera 6. The sensor unit 8 has several sensors 9. The position determination unit 7 has multiple position determination means 22, by means of which data on the actual position of the underwater device 1 is acquired.

The control device 17 is connected in a data-transmitting manner to the first other control device 16 and the second other control device 30 by means of a data bus 3. The data-transmitting connection is designed to be releasable and is realised by a plug-in connection.

The underwater device 1 has further electrical consumers described in more detail below and an electrical energy source 10. The electrical energy source 10 is used to supply electrical consumers with electrical energy.

By means of the energy distribution unit 14, the electrical energy provided by the energy source 10 is distributed to the electrical consumers. Furthermore, the energy distribution unit 14 electrically disconnects the electrical consumer from the electrical energy source 10 when a hazardous condition exists. The energy distribution unit 14 has several other sensors 11. The other sensors 11 are directly connected to the second other control device 30 in a data-transmitting manner. The second different control device 30 causes the electrical connection between the electrical energy source 10 and at least one electrical consumer to be disconnected when a hazardous condition exists.

The control device 17 is directly connected in a data-transmitting manner to the image capture unit 4, the position determination unit 7 and an electrical display device 13. The direct connection is realised by a data line 18. The underwater device 1 further has a switch 15 which is directly connected in a data-transmitting manner to the control device 17, the first other control device 16 and the second other control device 30, each by means of a data bus 3.

The control device 17 may have a processor. Furthermore, the control device 17 can communicate wirelessly, for example via WLAN, with communication devices not shown in the figures. The communication devices are located outside the underwater device 1, for example on a ship.

Using the hyperspectral camera 5 and the color camera 6, images of the water floor are captured. The control program executed on the control device 17 causes the captured images to be processed, compressed and stored. The image capture unit 4 can access the sensor values provided by the sensor unit 8 to adjust the exposure, focus distance and capture speed. Both the hyperspectral camera 5 and the colour camera 6 can each have a liquid lens. The control device 17 can be used for the aforementioned processing of the captured images.

The display device 13 can have a screen display 20 and a control unit in the form of control buttons 21. The control buttons 21 can be attached to a screen housing, as shown in FIG. 4. In this regard, some functions of the underwater device 1 can be adjusted by means of the control buttons 21. The display device 13 is directly connected to the control device 17 in a data-transmitting manner.

The position determination unit 7 has a plurality of position determination means 22, such as a sonar device, an underwater navigation system (USBL), a GPS receiver, etc., for determining the actual position of the underwater device 1, as was described previously. In this regard, the control device 17 can assist the position determination unit 7 in determining the actual position of the underwater device 1. In particular, the control device 17 can process the data provided by the position determining means 22. The position determination unit 7 is controlled by the control program executed on the control device 17.

This means that the control device 17 supports several technical functions. In particular, the control device 17 assists the image capture unit 4 in image processing, the display device 13 in displaying an operating state on the screen display 20, and the position determination unit 7 in determining the actual position. In an alternative embodiment not shown, the image capture unit 14 and/or the position determination unit 12 and/or the display device 13 can each have their own control device.

FIG. 1 shows the data-transmitting communication between the electrical function units of the underwater device 1 with solid lines. Communication between the electrical function units is handled using a communication protocol that has a publish/subscribe mechanism. The communication protocol used is the MQTT communication protocol.

A sensor value detected by a sensor 9 of the sensor unit 14 is published by the first other control device 16 in a data channel not shown. The sensor value can be received by the control device 17 and/or the second different control device 30 if the control device 17 and/or the second different control device 30 have subscribed to the data channel. For receiving the sensor value, the control device 17 and/or the second other control device 30 have receiving means.

Furthermore, the first other control device 16 can determine whether a sensor value detected by the sensor 9 deviates from a limit value or is outside a limit range and thus a hazardous condition exists. Should this be the case, the first other control device 16 can publish an alarm message in another data channel. Only the receiving means that have subscribed to the other data channel can receive the alarm message. Thus, the alarm message is not output to the image capture unit 4 that did not receive the other data channel. In contrast, the second other control device 30 has subscribed to the other data channel so that the alarm message is transmitted to the energy distribution unit 14. Subsequently, the energy distribution unit 14 can disconnect the electrical connection between the energy source 4 and the electrical consumers in processing mode.

In FIG. 1, the electrical connections between the components of the underwater device 1 are shown as dashed lines. As can be seen in FIG. 1, the energy distribution unit 14 is electrically connected to several electrical consumers. Here, the display device 13, the image capture unit 4, the control device 17, the switch 15, the sensor unit 8, and the position determination unit 7, in particular individual position determination means, each have at least one electrical consumer which has electronic components and can therefore be disconnected from the energy source 10 by means of the energy distribution unit 14.

The electrical energy source 10 has multiple batteries 24 and a battery control device 23 for controlling the batteries. The electrical energy source 4 is connected upstream of the energy distribution unit 14.

FIG. 2 shows the design of an energy distribution unit 14. As has already been described, the energy distribution unit 14 has several other sensors 11. Furthermore, the energy distribution unit 14 has at least one switching device 25 by means of which the electrical connection between the energy source 10 and the respective electrical consumer can be disconnected. For this purpose, the switching device 25 has a plurality of switches, not shown, by means of which the electrical connection to the respective electrical consumer can be disconnected. In particular, the switches can be used to disconnect the electrical connection of an electrical consumer separately and/or independently of other electrical consumers.

In addition, another sensor 11 is shown in FIG. 2, by means of which the current of the respective electrical consumer is acquired. The acquired current values are evaluated by the second other control device 30. The energy distribution unit 14 further has other sensors 11 by means of which a temperature, a pressure and/or the humidity within a cavity of the underwater device 1 can be determined.

Provided that a hazardous condition has been determined by the second other control device 30 and/or by the first other control device 16, the second other control device 30, when processing the alarm messages in the queue, causes the switching device 25, in particular the switch or switches, to be switched in such a way that the electrical connection between the energy source 10 and the electrical consumers is disconnected.

FIG. 3 shows a perspective view of the underwater device 1 from below. The underwater device 1 has a housing 11 which encloses a cavity, not shown. The electrical consumers and the energy distribution unit 14 are arranged in the cavity. The underwater device 1 has two openings on its underside. A first opening 6 is used to accommodate a sensor of the position determination unit, which is not shown. A second opening is closed by a transparent plate 5, such as a glass pane, and a housing receiving the transparent plate. The hyperspectral camera and the RGB camera can be placed inside the cavity in such a way that they can capture images of the seabed through the transparent plate 5.

The underwater device 1 also has two touchdown devices 27 projecting from the underside of the housing 26. The two, in particular rail-shaped, touchdown devices 27 run parallel to one another and are used to place the underwater device 1 on the seabed. In particular, the touchdown devices 27 can prevent the transparent plate 6 from coming into contact with the seabed.

The underwater device 1 has a recess for the electrical energy source 10 on one end face. The electrical energy source 10 is connected in a releasable manner to the housing 26 in the recess. In particular, the energy source 10 is connected to the housing 26 in a form-fitting and/or force-fitting manner. The energy source 10 has multiple batteries not shown in the figures.

The underwater device 1 also has two handles 28 attached to the housing 26 and facing each other with respect to the housing 26, as shown in FIG. 4. The diver can easily manoeuvre and move the underwater device 1 by means of the handles 28.

FIG. 4 shows a top view of the underwater device 1. The underwater device 1 has the display device 13 on another end face. The display device 13 has a screen display 20. In addition, the display device 13 has control buttons 21 by means of which the underwater device 1 is operated. In addition, the underwater device 1 has an LED display 29 which shows the operating state of the underwater device 1. In particular, the LED display 29 and/or the screen display 20 can be used to indicate whether a hazardous condition exists.

FIG. 5 shows a design of an underwater device 1 according to the invention in a second embodiment. The underwater device 1 shown in FIG. 5 differs from the underwater device shown in FIGS. 1 and 2 in that it has a memory unit 31. Another difference is that the embodiment shown in FIG. 5 has exactly two control devices, namely the control device 17 and the second other control device 30.

Also shown in FIG. 5 are the control programs 32-37 that control the energy distribution unit 14, the image capture unit 4, the position determination unit 7, the display device 13, the sensor unit 8 and the memory unit 31. The control program 32 for controlling the energy distribution unit 4 is executed on the second other control device 30. The remaining control programs are executed on the control device 17.

The control programs 32-37 each communicate with the data bus 3. The communication can take place via respective interfaces of the control device 17 or the second other control device 30. The control device 17 or the second other control device 30 are each connected to the data bus 3 in a data-transmitting manner via interfaces. In particular, the control programs 32-37 can communicate with the data bus 3 via the interfaces.

Furthermore, the control program 32 of the energy distribution unit 14 communicates with the other sensors 11 of the energy distribution unit 4. The control program 33 of the image capture unit 4 communicates with the hyperspectral camera 5 and the colour camera 6. The control program 34 of the position determination unit 7 communicates with the position determination means 22 and the control program 35 of the display device communicates with the screen display 20 and the control buttons 21. The control program 36 of the sensor unit 8 communicates with the sensors 9 of the sensor unit 8 and the control program 37 of the memory unit 31 communicates with an electrical memory 40, such as a hard disk. The control programs 32-37 communicate with their respective components via other interfaces of the control device 17 or the second other control device 30. The control device 17 or the second other control device 30 is connected in a data-transmitting manner to the aforementioned components by means of the other interface.

In operation, in the same way as in the first embodiment, the control device 17 can, for example, receive data from the cameras 5, 6 of the image capture units. The control program 33 of the image capture unit 33 can cause the data to be processed into images, for example. Furthermore, the control device 17, in particular the control program 33 executed thereon for the image capture unit, can cause the processed data to be transmitted into a data channel of the data bus 3. The data transmitted into the data channel of the data bus 3 can be received by the remaining function units if they have subscribed to the data channel. In particular, the control program of the respective function unit can cause the data transmitted in the data channel to be received. The received data can be further processed in the respective function unit.

FIG. 6 shows a design of an underwater device according to the invention in a third embodiment. The third embodiment differs from the second embodiment shown in FIG. 5 in that it has four control devices, namely control device 17, the first other control device 16, the second other control device 30 and a third other control device 38.

Here, the control program 32 for controlling the energy distribution unit 14 is executed on the second other control device 30. The control programs 33, 36, 37 are used for controlling the image capture unit 4, the sensor unit 8 and the memory unit 31 and are executed on the control device 17. The control program 34 for controlling the position determination unit 22 is executed on the first other control device 16 and the control program 35 for controlling the display device 13 is executed on the third other control device 38.

Data is exchanged between the function units in the same way as in the embodiments of the underwater device 1 described above.

The underwater devices 1 shown in FIGS. 5 and 6 can be designed in the same way as the underwater device according to the first embodiment, except for the differences described. In particular, the underwater devices 1 shown in FIGS. 5 and 6 can have the design shown in FIGS. 3 and 4.

LIST OF REFERENCE SIGNS

1 Underwater device
3 Data bus
4 Image capture unit
5 Hyperspectral camera
6 Reference camera
7 Position determination unit
8 Sensor unit
9 Sensor
10 Electrical energy source
11 Other sensors
13 Electrical display device
14 Energy distribution unit
15 Switch
16 First other control device
17 Control device
18 Data line
20 Screen display
21 Control buttons
22 Positioning means
23 Batteries
24 Battery control device
25 Switch
26 Housing
27 Touchdown device
28 Handle
29 LED display
30 Second other control device
31 Memory unit
32 Control program for controlling the energy distribution unit
33 Control program for controlling the image capture unit
34 Control program for controlling the position determination unit
35 Control program for controlling the display device
36 Control program for controlling the sensor unit
37 Control program for controlling the sensor unit
38 Third other control device
40 Electrical memory

The invention claimed is:

1. An underwater device (1) for capturing images of a seabed, the underwater device comprising:

multiple electrical function units, a first control program for controlling a first electrical function unit of the multiple electrical function units, a second control program for controlling a second electrical function unit of the multiple electrical function units, a data bus providing bidirectional data exchange, wherein the data bus is a data line connection, a first control device connected to the data bus, and a second control device that is a separate unit from the first control device and does not share a circuit board with the first control device, wherein the second control device is selectively connected to the data bus, a switch connected to the data bus between the first control device and the second control device, the switch having a plurality of connection interfaces, wherein the multiple electrical function units are connected to the data bus and the multiple electrical function units can be modified by adding and/or replacing electrical function units by way of the plurality of connection interfaces;

wherein at least one additional control device is connectable to the data bus by way of the plurality of connection interfaces;

wherein a level of processing power needed to execute the first control program and the second control program depends on an operational deployment of the underwater device and/or the multiple electrical function units;

wherein (i) the first control program and the second control program are selectively executable on the first control device and (ii) the first control program and the second control program are selectively executable on the first control device and on the second control device, respectively, wherein allocation of execution is selected based on the level of processing power needed to execute the first control program and the second control program;

wherein the multiple electrical function units are configured to communicate with each other using a message-based communication protocol having a publish/subscribe mechanism.

2. The underwater device (1) according to claim 1, characterised in that the communication protocol used for data communication comprises Message Queue Telemetry Transport Protocol (MQTT).

3. The underwater device (1) according to claim 1, characterised in that a. the message-based communication protocol is configured to allow the first electrical function unit and/or the second electrical function unit to publish information in at least one data channel of the data bus and/or that b. the message-based communication protocol is configured to allow the first electrical function unit and/or the second electrical function unit to receive information from at least one data channel of the data bus.

4. The underwater device according to claim 3, characterised in that a. the first control device is configured to publish the information of the first electrical function unit and/or the second electrical function unit in the at least one data channel or that b. the first control device is configured to publish the information of the first electrical function unit in the at least one data channel and the second control device publishes the information of the second electrical function unit in the at least one data channel.

5. The underwater device according to claim 3, characterised in that a. the first control device is configured to receive the information of the first electrical function unit and/or the second electrical function unit from the at least one data channel or that b. the first control device is configured to receive the information of the first electrical function unit from the at least one data channel and the second control device receives the information of the second electrical function unit from the at least one data channel.

6. The underwater device (1) according to claim 3, characterised in that the underwater device (1) has a control centre configured to manage information published in a data channel by the first electrical function unit and/or by the second electrical function unit, wherein the control centre is configured to transmit the information published in the data channel to receiving means subscribed to the data channel.

7. The underwater device (1) according to claim 6, characterised in that the first control device and/or the second control device has the receiving means.

8. The underwater device (1) according to claim 6, characterised in that the first control device or the second control device has the control centre.

9. The underwater device (1) according to claim 1, characterised in that the first electrical function unit and the second electrical function unit are directly connected in a data-transmitting manner, in particular in a releasable manner, to the first control device when the first control program and the second control program are executed on the first control device.

10. The underwater device according to claim 1, characterised in that the first control device and the second control device are connected to one another in a data-transmitting manner, in particular in a releasable manner, by means of the data bus.

11. The underwater device (1) according to claim 1, characterised in that the first electrical function unit is an image capture unit, in particular of modular design, for capturing an image of the seabed, wherein the image capture unit (4)

a. has a hyperspectral camera (5) for capturing images of the seabed and/or b. has a colour camera (6), in particular an RGB camera, for capturing images of the seabed.

12. The underwater device (1) according to claim 1, characterised in that the underwater device (1) is configured to map the seabed based on the captured images.

13. The underwater device (1) according to claim 1, characterised in that the electrical function units include a. a position determination unit (7), in particular of modular design, for determining a position of the underwater device (1);

b. a sensor unit, in particular of modular design, which has at least one sensor (9) connected in a data-transmitting manner to the first control device or the second control device; and/or c. an electrical display device for indicating the operating state of the underwater device.

14. The underwater device (1) according to claim 1, characterised in that the electrical function units include an energy distribution unit (14) for distributing electrical energy between an electrical energy source (10) and an electrical consumer, wherein the energy distribution unit (14) has at least one other sensor (11) which is connected in a data-transmitting manner to the first control device or the second control device.

15. The underwater device (1) according to claim 14, characterised in that current supplied to the electrical consumer or voltage applied to the electrical energy source (10) or to a data acquisition unit can be determined by means of the sensor (11).

16. The underwater device (1) according to claim 13, characterised in that a temperature or a humidity or a pressure within a cavity of the underwater device (1) can be determined by means of the sensor (9).

17. The underwater device (1) according to claim 14, characterised in that the underwater device (1) is configured to determine whether a hazardous condition exists for an electrical consumer based on the sensor value, and that the energy distribution unit (14) disconnects the electrical consumer from the electrical energy source (10) when a hazardous condition exists.

18. The underwater device (1) according to claim 1, characterised by an electrical energy source (10) for supplying electrical energy to an electrical consumer, wherein the electrical energy source (10)

a. is designed to be modular and/or b. has a battery control device (23) for monitoring a battery condition and/or c. is connectable to a housing (26) of the underwater device (1) in a releasable manner.

19. The underwater device (1) according to claim 1, characterised in that the underwater device (1) does not comprise a propeller.

20. The underwater device (1) according to claim 1, characterised in that the underwater device (1) is a diver-operated underwater device or an autonomous underwater vehicle or a cable-guided underwater vehicle.

\* \* \* \* \*